United States Patent [19]
Golben

[11] Patent Number: 5,688,611
[45] Date of Patent: Nov. 18, 1997

[54] SEGMENTED HYDRIDE BATTERY INCLUDING AN IMPROVED HYDROGEN STORAGE MEANS

[75] Inventor: P. Mark Golben, Florida, N.Y.

[73] Assignee: Ergenics, Inc., Ringwood, N.J.

[21] Appl. No.: 673,104

[22] Filed: Jul. 1, 1996

Related U.S. Application Data

[63] Continuation-in-part of Ser. No. 267,038, Jun. 27, 1994, Pat. No. 5,532,074.

[51] Int. Cl.$^6$ ............................................. H01M 10/52
[52] U.S. Cl. .............................. 429/53; 429/58; 429/101
[58] Field of Search ............................... 429/53, 58, 101; 204/246, 277

[56] References Cited

U.S. PATENT DOCUMENTS

| | | | |
|---|---|---|---|
| 5,250,368 | 10/1993 | Golben | 429/101 X |
| 5,264,301 | 11/1993 | Sindorf et al. | 429/101 X |
| 5,389,459 | 2/1995 | Hall | 429/101 |
| 5,532,074 | 7/1996 | Golben | 429/53 |

Primary Examiner—Stephen Kalafut
Attorney, Agent, or Firm—Dorn, McEachran, Jambor & Keating; Vangelis Economou

[57] ABSTRACT

An apparatus for and method of storing hydrogen gas within an enclosed metal hydride container that is isolated from an apparatus which uses hydrogen gas, including a constricted opening having a valve to selectively open or close the hydrogen gas communication between the hydrogen storage container and the apparatus using the hydrogen. The hydrogen storage material within the hydrogen storage container comprises mixture of metal hydride particles with interspersed water adsorbing particles, such as silica gel dessicant. Optionally included within the hydrogen gas communication between the storage and use may be a filter for filtering out oxygen and water vapor molecules from the hydrogen stream passing into the metal hydride particles, and may comprise a coating on each of the hydrogen absorbing metal hydride particles disposed within the hydrogen storage chamber. The enclosed metal hydride chamber may be disposed either within the containment of the battery cells another apparatus using the hydrogen gas or alternatively, the chamber may be external of the apparatus. A preferred corrosion resistant metal hydride may be used comprising Lanthanum Nickel Aluminum ($LaNi_{4.7}Al_{0.3}$) or $La_{0.8}Nd_{0.2}Ni_{3.5}Co_{1.3}Al_{0.2}$.

15 Claims, 2 Drawing Sheets

SEGMENTED HYDRIDE BATTERY INCLUDING AN IMPROVED HYDROGEN STORAGE MEANS

CROSS REFERENCE TO RELATED APPLICATION

This is a continuation-in-part of U.S. patent application Ser. No. 08/267,038, filed on Jun. 27, 1994 now U.S. Pat. No. 5,532,074.

BACKGROUND OF THE INVENTION

1. Field of the Invention

The present invention relates generally to metal hydride batteries and more specifically, relates to metal hydride batteries with a hydrogen storage capacity for providing passive purification of a hydrogen gas stream to remove water vapor and oxygen entrained within the hydrogen.

2. Background Art

Metal hydride electrochemical fuel cells are in serious consideration as the next generation power source for providing power to automotive and other zero emission locomotive uses. Several innovative techniques have been described for obtaining electrical power from electrochemical cells utilizing the combining reaction of hydrogen with oxygen to produce water. One classification of these techniques is between reversible and irreversible reactions.

A major consideration for electrochemical cells utilizing hydrogen as reactant is the necessity of providing and maintaining a clear, undiluted storage supply of hydrogen for use in the electrochemical reactions. For a detailed discussion of the background and considerations which enter into choosing components of an electrochemical battery system, and the requirements for such a system which utilizes a hydrogen storage capacity, reference is made to co-pending U.S. Pat. No. 5,532,074, the teachings of which are incorporated herein by reference.

A key consideration in avoiding material deterioration or decomposition of the components of the hydrogen storage system is the elimination of impurities, such as oxygen or water vapor, from the hydrogen gas stream delivered to the metal hydride storage material. Various methods have been proposed tending to inhibit or eliminate contact of oxygen or water vapor with the metal hydride hydrogen storage device.

U.S. Pat. No. 5,128,219 describes an electrode protection mechanism for inhibiting contact of the metal hydride, hydrogen storing negative electrode with oxygen formed during the electrolytic reaction. U.S. Pat. No. 5,250,368 proposes to isolate the metal hydride storage material from the battery cell housing. However, even when isolated from each other, the electrochemical reaction in the battery cells produces sufficient water vapor that becomes entrained in the hydrogen stream to cause water vapor to reach the metal hydride and release oxygen atoms which are absorbed into the metal hydride. Thus, a means is necessary to inhibit or eliminate water vapor and/or oxygen from coming into contact with the metal hydride.

The solution to this problem proposed by U.S. Pat. No. 5,250,368 is to include elements in an in-line piping network between the hydride storage vessel and the electrochemical cell chamber or housing. These elements are designed to purify and filter out the entrained water vapor and oxygen from the hydrogen stream passing through the communication means. The molecular sieve material has a strong affinity for water vapor, but does not absorb hydrogen readily. The material will absorb and remove the water vapor from the hydrogen stream down to a very low vapor pressure, on the order of 1 to 10 ppm. During battery discharge, hydrogen gas leaves the metal hydride container and passes back through the in-line piping and the molecular sieve material. However, to evaporate the water in the molecular sieve material, electrical heating up to about 250° C. is required. At this temperature, the molecular sieve material cannot "hold" very much water and, therefore, rejects the water vapor back into the hydrogen stream, thus, in effect, rehumidifying the hydrogen stream before it (the $H_2$ stream) enters the $Ni/H_2$ cell. Since the purification mode used here requires external electrical energy for molecular sieve heating to "regenerate" the water vapor, it is considered an "active" purification process.

Another method which is disclosed and claimed in the parent U.S. Pat. No. 5,532,074 is a passive system which in effect filters out the water vapor or oxygen impurities from the passing hydrogen gas stream. The water molecules are described as collecting on the surface of a film of filter material so that the impurities are not allowed to pass through to the metal hydride hydrogen storage material when the system is charging. During discharge, when the hydrogen gas is passing in the opposite direction, the water vapor "evaporates" and once again becomes entrained in the hydrogen gas stream.

It has been found however that a drop-off in the rate of hydrogen gas absorption by the metal hydride material develops after a certain point. As will be described below in relation to the specific inversion embodiments, it is believed that water vapor gathers and even condenses adjacent to the metal hydride particles, which slows down the hydrogen absorption process.

Still another method of passive "filtering" of water vapor from a passing hydrogen gas stream is described in U.S. Pat. No. 4,343,770. One section of a communication means (filter unit) includes an adsorbent, selected from the group consisting of molecular sieves, alumina, charcoal and silica gel, to adsorb the water from a stream of hydrogen gas passing through the filter unit. When the hydrogen gas is discharged from the storage facility, it passes through the adsorbent thereby cleaning the adsorbent of water impurities and the hydrogen gas is then used where the impurities, such as water vapor, are immaterial.

What is considered necessary to providing an efficient and long-lasting hydrogen storage means is a water vapor adsorbent which has a greater surface area such that even the accumulation of large amounts of water does not impede continued passage of the hydrogen gas into the hydride storage material.

SUMMARY OF THE INVENTION

Accordingly, this invention describes and claims a segmented metal hydride battery system comprising the following elements: a containment can, a stack of hydrogen-metal oxide cells, defining a hydrogen-metal oxide battery, disposed within the containment can, a hermetically enclosed hydrogen storage chamber having at least one aperture and containing a metal hydride material for retaining and storing a concentrated volume of hydrogen, the metal hydride material being capable of releasably absorbing and discharging gaseous hydrogen, and the metal hydride material comprising a mixture of water vapor absorbing particles and metal hydride particles, a communication means having at least one aperture and disposed between the hydrogen-metal oxide battery and the enclosed hydrogen storage chamber for permitting reversible communication of a hydrogen gas stream flow between the battery and the chamber, a means for selectively opening and closing the communication means to selectively permit and restrict hydrogen gas flow between the hydrogen-metal oxide battery and the enclosed hydrogen storage vessel through the aperture. The water vapor adsorbing particles preferably comprise a desiccant, such as silica gel or molecular sieve powders. The metal hydride particles may comprise a conventional metal hydride, such as a Lanthanum Nickel alloy, but more preferably comprises a metal hydride alloy which is more resistant to corrosion from oxygen contamination, such as a Lanthanum Nickel Aluminum alloy ($LaNi_{4.7}Al_{0.3}$) or $La_{0.8}Nd_{0.2}Ni_{3.5}Co_{1.3}Al_{0.2}$.

DETAILED DESCRIPTION OF THE PREFERRED EMBODIMENT

Figure 1:
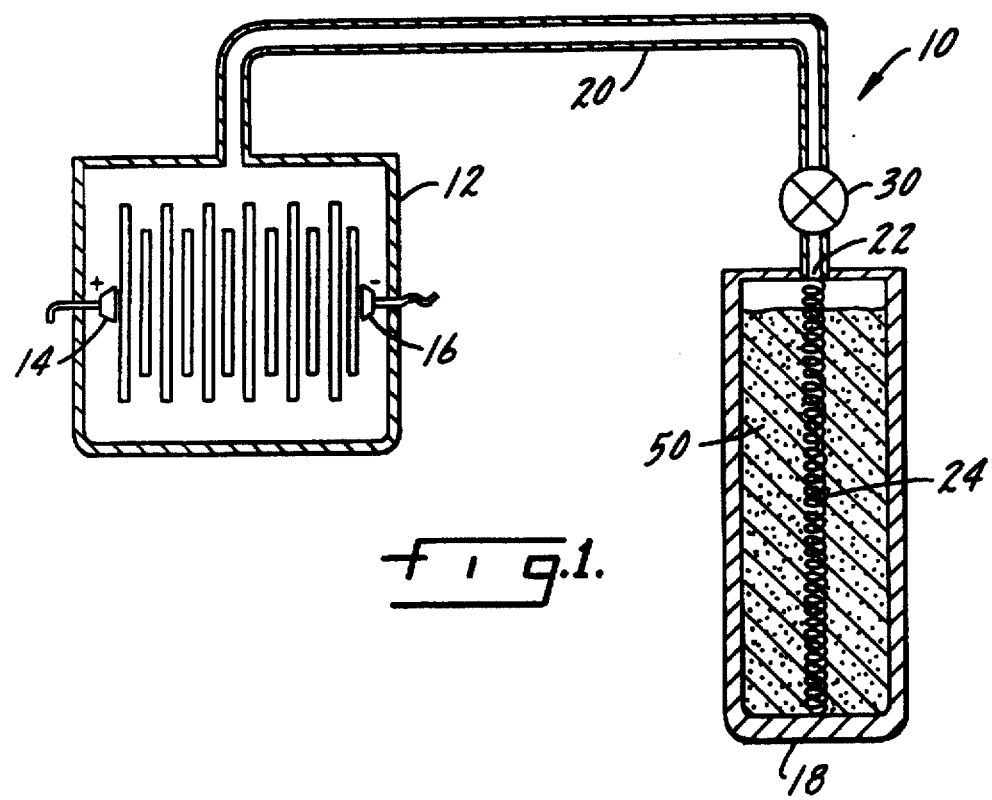
FIG. 1 illustrates a plan view of a segmented hydride battery according to the present invention.

The invention is shown by the schematic diagram in FIG. 1 illustrates a battery and hydrogen storage system 10. In the preferred embodiment, system 10 comprises a nickel-hydrogen battery cell 12 having a positive electrode 14 and a negative electrode 16. The precise construction of the cell is not overly significant to the invention, and the cell 12 may be conventional or may be of special construction. It should be appreciated that the only requirement is that the electrochemical reaction required for operation of the cell utilizes hydrogen gas. Any type of metal-hydrogen battery cell may utilize the teachings of this invention. For a general discussion of these types of cells, which utilize hydrogen as the energy imparting medium, reference is made to the parent U.S. Pat. No. 5,532,074, which is commonly assigned with this invention.

The electrochemical cell 12 is maintained in fluid communication with other elements of the system, such as a hydrogen storage chamber 18, through a hermetically sealed piping means 20. Preferably, piping means 20 provides fluid communication throughout the complete system 10, connecting all of the elements in an in-line connection. The in-line connection defined by piping means 20 provides a gas transmission path through the system. In the preferred embodiment, the gas being transmitted is hydrogen and the piping means 20 is a singular, but linearly segmented, means for the transmission of the hydrogen gas.

Alternatively, the hydrogen storage means may be disposed within a battery cell housing (not shown). These type of systems are similar to the one shown schematically in FIG. 1, in that they require a separation means between the hydrogen storage means and the battery cell.

The separation means of the system may be a separation plate disposed between adjacent battery and hydrogen storage chambers and having an aperture 22 in the plate, or may comprise a fluid communication means such as piping 20, as shown in FIG. 1. In either configuration, the system 10 must include a means to selectively open or close fluid communication through the aperture 22 between the battery cell and the hydrogen storage means. As shown in FIG. 1, for example, the piping means 20 provides a linear progression between the battery cell in housing 12 and the storage means 18, and includes a valve 30 to selectively open and close gas communication in the piping means 20 between the cell housing 12 and aperture 22 adjacent the hydrogen storage chamber 18. Preferably, a compressed spring mechanism 24 provides a fluid passage for speedier dispersal of the hydrogen gas throughout the hydrogen storage material, as is taught by commonly assigned U.S. Pat. No. 4,396,114, incorporated by reference herein.

Valve 30 is shown schematically in FIG. 1, but may comprise any of a number of different forms. For example, the valve 30 may be a manually operated gas cock, or a variable gas valve which may be used to regulate the rate of charging and/or discharging of the battery. Preferably, the valve 30 is a solenoid valve which is electrically controlled to a sensing mechanism that automatically shuts off gas communication when a predetermined charging capacity of the system is achieved. A parallel electrical connection to a switch may be used to reopen gas communication and to commence the discharge mode of the system 10.

An optional heat exchanger (now shown) may be provided in-line in the piping means 20 to cool off the gaseous hydrogen which is being transmitted to the battery cell 12 during a discharge step of the battery and hydrogen storage system. Another optional element in the system, also in-line with the piping means 20, may be a catalytic converter (not shown) for converting $O_2$ molecules, in combination with hydrogen from the gaseous stream, into water. Stray oxygen molecules may find their way into the system 10, even if it is hermetically sealed, as a result of the electrolytic reaction which occurs in the battery cell 12. More detailed description of the these optional elements may be found in U.S. Pat. No. 5,250,368, which is incorporated herein by reference.

The metal hydride battery system according to this invention includes a unique and innovative water vapor displacement technique that may also incorporate use of the inventive construction and/or alloys of one or more of the above described U.S. patents, the contents of which have been incorporated by reference. These combinations will be described below with reference to specific embodiments.

Figure 2:
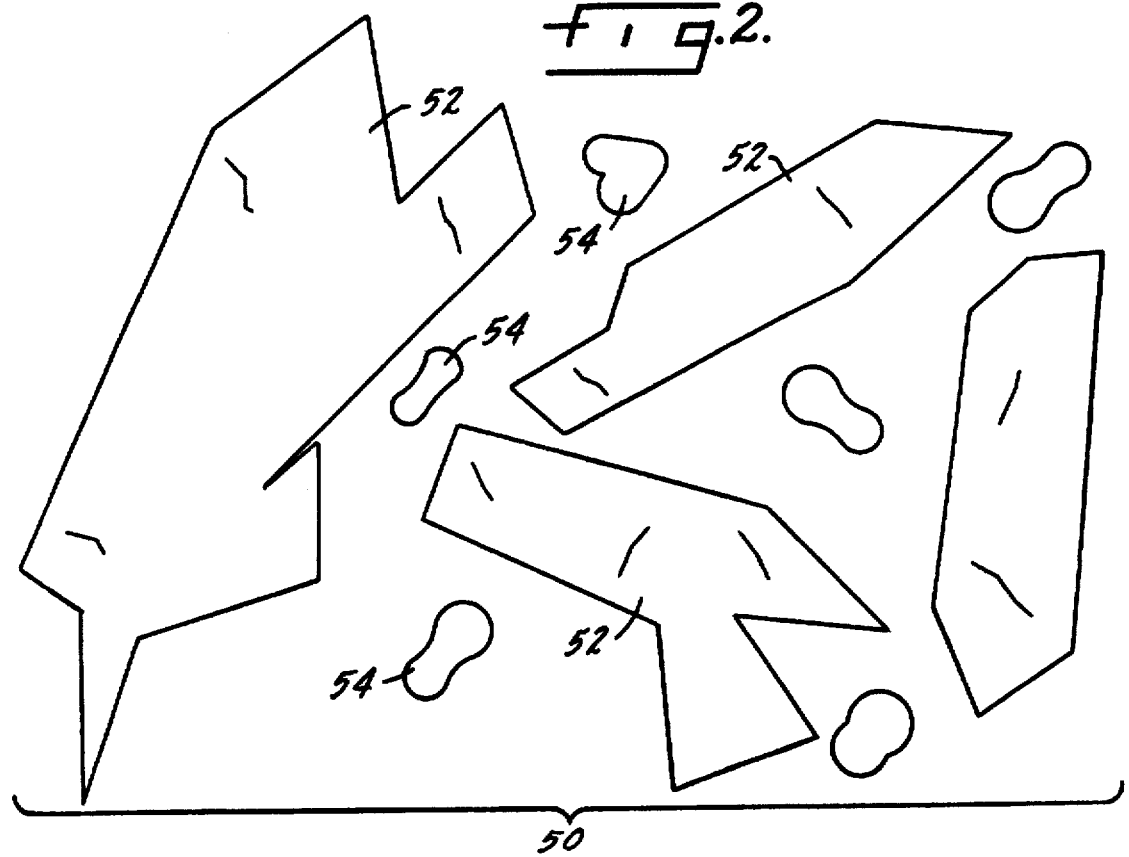
FIG. 2 illustrates a cross-sectional microscopic view of the metal hydride material according to the present invention.

Referring now to FIG. 2, illustrated is a magnified portion of the inventive metal hydride alloy/water vapor displacement material 50, which is combination which comprises both a hydrogen absorbing metal hydride and a water vapor storage medium.

The inventive hydrogen storage material 50 is a mixture of metal hydride particles and water vapor absorbing particles. The metal hydride particles 52 may be crystalline in structure and may comprise a conventional Lanthanum-Nickel alloy ($LaNi_5$). More advantageously, and preferably, the metal hydride particles 52 comprise a Lanthanum-Nickel-Aluminum alloy ($LaNi_{4.7}Al_{0.3}$) or a substituted alloy, such as Mischmetal Nickel Cobalt Aluminum (Mn $Ni_{5-x-y}Co_yAl_x$) or $La_{0.8}Nd_{0.2}Ni_{3.5}Co_{1.3}Al_{0.2}$, which intermetallic compounds are themselves corrosion resistant to oxygen contamination.

Interposed within the metal hydride particles 52 are particles 54 of an appropriate water vapor adsorbent material, such as a silica gel, powder ($SiO_2$). Sodium Silica Aluminate ($Na_{12}[AlO_2(SiO_2)_{12}]xH_2O$), or another appropriate desiccant. The water vapor adsorbent particles 54 may be somewhat smaller in size and have a less ordered structure, as shown in a more spherical configuration in FIG. 2.

The range of sizes for the metal hydride particles are from about 0.0017 inches in diameter or less, and the water adsorbent material particles 54 are about 0.00079 inches in diameter or less. However, effective results may be obtainable with larger and/or smaller particles 52, 54, as long as the particles are mixed sufficiently to effectuate the water absorbing capacity of particles 54.

The relative ratio of dessicant to metal hydride particles by weight percent is from about 1% to about 10%, with a preferable range being approximately from 3% to 7% and a most preferable value of about 5%. However, with greater advances made in the types of alloys used to inhibit oxygen corrosion, the weight percent proportion of the water absorbing particles may be reduced to between 1% and 3%. These ranges have been determined to provide an optimum balance between the need to maximize hydrogen storage capacity, i.e., to include as much metal hydride material as possible, while simultaneously ensuring that the greatest amount of water vapor is adsorbed in the adsorbent material particles 54.

An alternate way to determine particle size is to measure mesh size in a standard or conventionally known method. The preferred mesh size for the metal hydride powder is −325 mesh and is preferably manufactured by using a mechanical grinding process on the non-hydrided state, that is, in the pure metal alloy without absorbed hydrogen contained therein.

Alternatively the Lanthanum Nickel Aluminum metal hydride material has been found to provide a greater surface area, and thus a faster hydrogen absorption effectiveness, by utilizing a non-hydrided powder which passes through a −635 mesh (0.00079 inches or smaller average particle size). Still another method of providing a powder of the preferred metal hydride alloy is to hydride/dehydride the metal alloy to obtain a powder which passes through a −325 mesh (0.0017 inches or smaller average diameter).

The preferred molecular sieve dessicant material is a commercially available from the Grace-Davison division of W. R. Grace & Co. of Baltimore, Md., and is sold under the trade name SYLOSIV A3 powder. A preferred silica gel dessicant material is also available from the aforementioned Grace Davison division under the trade name SYLIOD 63.

The dessicant material is selected based on the particular properties desired in the battery system 10. The silica get and/or molecular sieve material particles 54 provide a dual function by first removing water vapor from the passing hydrogen gas stream so that the water vapor does not come into contact with the metal hydride particles 52. During the discharge process, the "dry" hydrogen gas which is exiting from the metal hydride particles passes close to and around dessicant particles, and in the process, some water vapor exits from the dessicant particles 54 and becomes again entrained in the passing hydrogen gas stream which is directed toward the battery cell in housing 12. The water vapor in the hydrogen gas is not detrimental to the operation of the battery cells.

An advantage arises from the interspersing of the dessicant particles 54 within the metal hydride particles 52 and the fact that there is a significant amount of contact of their surfaces. As described above for the presently known in-line devices in which the dessicant material is separate from the metal hydride material, an active or positive energy in the form or heat must be provided to the molecular sieve so as to induce the water vapor to evaporate into the hydrogen gas stream. The advantage provided by this invention is the drop in hydrogen pressure causes the hydrogen to be expelled from the metal hydride material. The expelled hydrogen leaves the metal hydride through the surrounding water vapor cloud and quickly absorbs the stored water contained in the dessicant particles 54. The close proximity of metal hydride particles 52 to that of the dessicant particles 54 greatly aids the release of water vapor from the dessicant (an endothermic process) by providing an ambient heat source—the sensible heat capacity of the metal hydride itself—to supply the heat needed for water vapor release. The heat is transferred by conduction and convection from the metal hydride powder 52 to the adjoining cooler dessicant particles 54. The heat aids the evaporation of the water in the dessicant, which then becomes entrained within the hydrogen gas stream. This heating process is done without any input of electrical or heat energy, and thus, use of external energy is not necessary in removal of water vapor from the dessicant material particles 54. Once the dessicant material has expelled a significant portion of its retained water, the dessicant particles 54 are then once again ready to absorb the water vapor during the subsequent charging process.

Figure 3:
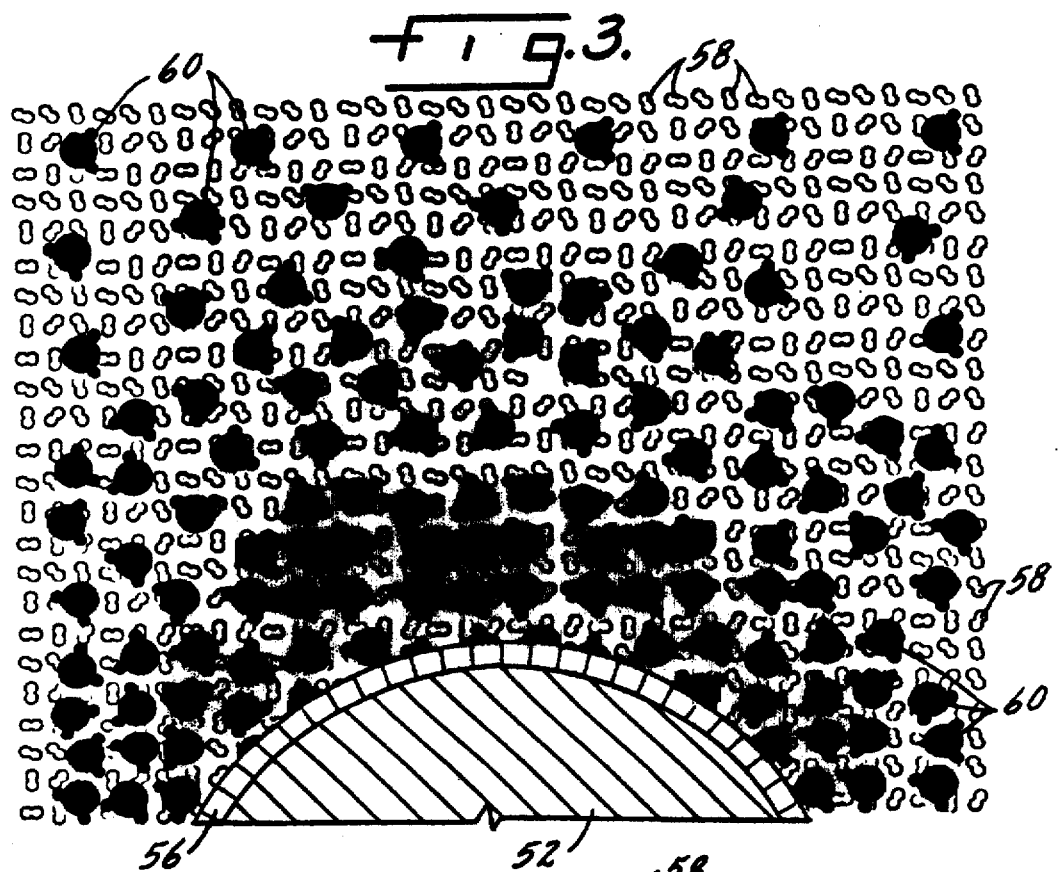
FIG. 3 illustrates a representational view of a detail of the inventive metal hydride and of the surrounding molecular gaseous environment.

Another significant advantage deriving from the interposition of the dessicant particles 54 between the metal hydride particles 52 (FIG. 2) is the removal of the water vapor from the proximity of the surface of the metal hydride particles 52. As shown in the illustration of atomic scale schematic FIG. 3, a metal hydride particle 52 having an appropriate coating 56 is shown following a period of hydrogen gas absorption. The hydrogen molecules ($H_2$) 58 are shown as small double atomic configurations and the water vapor molecules are shown each as a larger oxygen atom attached to two hydrogen atoms. In the illustration of FIG. 3, the absorption of hydrogen within the metal hydride material particle 52 and the occlusion of water vapor molecules 60 from the particle 52 provides an increased density of water vapor molecules 60 in the space immediately adjacent the surface of the particle 52, which acts as a vapor block to further absorption of hydrogen gas molecules 58 into the metal hydride particle 52. In an extreme case, the water vapor molecules 60 may actually condense on the surface of the coating 56, thereby occluding completely the further absorption of the hydrogen gas molecules 58.

Returning now to FIG. 4, where the inventive embodiment is shown, the close proximity of dessicant particles 54 draws off water vapor molecules 60 from the vicinity of the surface of the metal hydride particles 52. The decrease in the amount of water vapor molecules 60 available around the metal hydride particles 54 permits access of the hydrogen gas molecules 58 to the surface of the metal hydride particles 52, and their quick absorption within the particles 52. The net effect of the array of particles 52, 54, as illustrated in FIG. 1 is that the particles 52, 54 each absorb the respective molecules, whether hydrogen 58 or water vapor 60 (FIG. 4) for which they are best suited.

Figure 4:
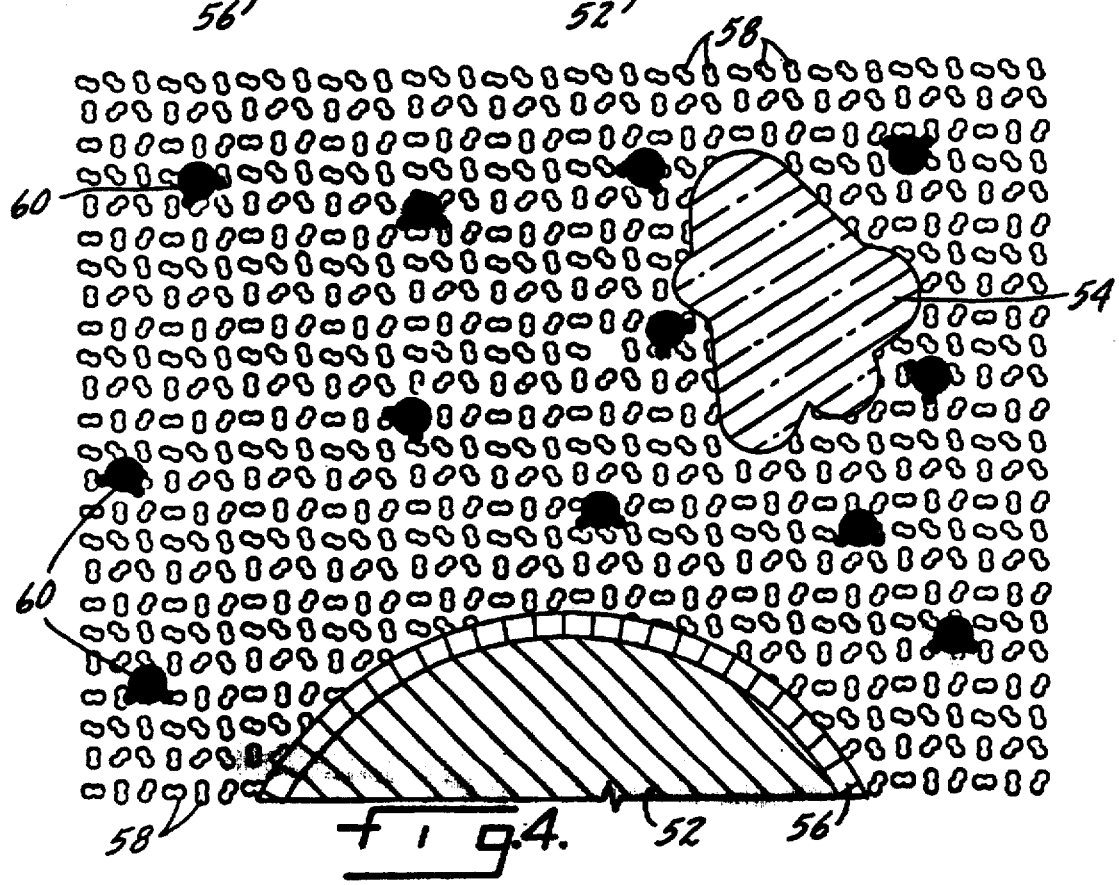
FIG. 4 is a representational view of the combination metal hydride storage material according to the present invention and of the surrounding molecular gaseous environment.

As can be seen from study of the surface of the metal hydride material 52, in FIG. 4, a film material 56 may be used in conjunction with the dessicant particles 54. It has been found that use of the interspersed dessicant particles 54 by themselves absorb sufficient amounts of water vapor molecules 60 such that corrosion due to the deleterious effects of oxygen on the metal hydride material can be avoided. This feature applies particularly in the case when the inventive corrosion resistant alloys described above are used.

However, in the long term, and after repeated and prolonged exposure to water vapor, the metal hydride material necessarily deteriorates and the hydrogen adsorbing capacity declines enough to affect the performance and continued use of the battery system 10 over a great number of cycles. As a further refinement to the invention described herein, it is considered necessary for long term effectiveness and continued use to utilize a combination of a water vapor absorbing dessicant material particles 54 in conjunction with a film 56 on the metal hydride particles 52 which is water and carbon dioxide repellant, in accordance with the teachings of the parent U.S. Pat. No. 5,532,074.

Use of both a dessicant material particles 54 and a film 56 on the surface of the metal hydride material provides at least two advantages. First, a marked reduction is effected in the deterioration and corrosion of the metal hydride material, especially over a great number of cycles of use in the battery system 10. A second advantage is that the ratio weight of the dessicant material particles 56 to the total weight of metal hydride particles need not be so great as to inordinately affect the capacity of the metal hydride particles 52 to absorb hydrogen. In certain applications of the battery system, such as in space of under water, hydrogen absorbing capacity relative to weight of metal hydride total material and in addition, where extended uses are very important, it is considered desirable to reduce the ratio of dessicant material to metal hydride material as much as possible. Accordingly, a film 56 which repels the water molecules is sufficient to direct the water molecules toward dessicant material particles 54 despite a 50% reduction in the properties by weight of dessicant material which is present. Thus, it is a more effective use of the features described in this invention to utilize both a water vapor repellant film 56 and dessicant particles 54, thereby increasing the efficiency of either invention if used separately.

In operation, the system 10 has three modes, a charge mode, a discharge mode and a static mode. The valve 30 is open during the charge and discharge modes to permit hydrogen gas communication between the battery cell 12 and the hydrogen storage chamber 18. During the charge mode, electrical energy imparted from an outside source, e.g., an electrical charger connected to the electric grid, or to a solar panel providing an electric current directly to the electrodes 14, 16 of the cell, causes the cell to drive the reverse electrochemical reaction and to generate hydrogen gas. For a more complete, detailed description of the equilibrium electrochemical reaction in a metal hydride battery, reference is made to U.S. Pat. No. 5,532,074, the teaching of which is incorporated herein.

In summary, the charging reaction depends on electrical current to generate hydrogen gas from water, and that hydrogen generation increases hydrogen gas pressure in the system so that the metal hydride particles 52 in the hydrogen storage chamber 18 is forced to adsorb the hydrogen gas. When a sufficient amount of gas is adsorbed, the system is said to be charged and the valve 30 may be shut off, whether by a manual or other method.

Upon shutting the valve 30, a double equilibrium for hydrogen gas pressure is achieved. In the electrochemical cell chamber 12, disconnection of the electric energy source from contact with electrodes 14, 16 no longer drives the hydrogen generating electrochemical reaction. The hydrogen gas pressure in the cell chamber 16 thus decreases due to a phenomenon known as self discharge. The electrodes 14, 16 come into contact with stray ions which cause some electrical discharge and which cause the reverse reaction, which consumes hydrogen gas, to deplete the hydrogen in the chamber until a point where equilibrium is achieved.

On the other hand, a much higher pressure equilibrium is achieved within the hydrogen storage chamber 18. At the time the valve 30 is shut, the system 10 is an approximately a uniform pressure, with the hydrogen gas flowing from the electrochemical cell to the hydride material 50. As the hydride material continually adsorbs the hydrogen, a capacity plateau is reached. In the plateau, the hydride material no longer can adsorb more hydrogen because hydrogen capacity has been reached for that pressure. Additional hydrogen pressure may not be available, thus the system 10 has reached an equilibrium point. At that point, the hydrogen gas pressure in the chamber 18 is maintained at a constant level at those particular conditions. After gas pressure equilibrium is reached in both chambers 12 and 18, the valve 30 separates a gas pressure in chamber 18 which is significantly higher than in the electrochemical cell chamber 12. As soon as valve 30 is opened, a rush of hydrogen gas into the cell chamber 12 again drives the electrochemical cell to produce an electricity potential at the electrodes 14, 16 and to consume hydrogen gas in the process as electric current is drawn off from the battery cell.

When the system 10 is needed to provide electrical power, contact is first effected to the electrodes 14, 16 and the valve 30 is opened. As hydrogen reaches the battery cells, electricity is generated and hydrogen is consumed, thereby reducing the gas pressure in the cell housing 12. As gas pressure is reduced, hydrogen flows from the hydrogen storage chamber 18 to the cell housing 12, continuing to drive the electrochemical reaction to produce electric current. When the hydrogen gas reaches a new equilibrium because it is depleted from the metal hydride storage, the system 10 is fully discharged, and must be recharged for further use.

Other embodiments of this invention would become obvious to a person of ordinary skill in the art once a full appreciation of the features of the present invention are understood. One such modification is replacement of the nickel hydrogen electrochemical portion of the system with other types of electrochemical batteries, such as Manganese Oxide or Silver Oxide batteries, or by a fuel cell, and especially a regenerative fuel cell.

In the case of regenerative fuel cells, the fuel cell could be an alkaline, molten carbonate, phosphoric acid or Proton Exchange Membrane (PEM). In a PEM fuel cell, hydrogen supplied from the metal hydride storage system is catalyzed at the negative electrode (anode) to produce protons and electrons. The protons are transported through the ionically conductive polymer material (e.g., Nafion available from DuPont) to the oxygen catalyst electrode (cathode). The oxygen catalyst electrode provides a site for the combination of oxygen with hydrogen protons to produce water molecules. Fuel cells of this type are described in greater detail in U.S. Pat. Nos. 4,826,741 and 5,532,074, which are both herein incorporated by reference.

Regenerative PEM fuel cells can also be used in reverse and therefore operate as an electrolyzer. The oxygen can be supplied by a separate oxygen storage where oxygen is not readily available. When it is available, oxygen is most preferably supplied by surrounding ambient air. When used as an electrolyzer, the regenerative fuel cell converts electrical energy and water into the separate atomic components of water, that is hydrogen and oxygen. The hydrogen, humidified with water vapor which becomes entrained tin the hydrogen stream, returns to the metal hydride storage container where both hydrogen and water vapor are reabsorbed by the inventive metal hydride dessicant material, as is described above. The oxygen is rejected to the surrounding ambient air or restored in the oxygen storage unit for reuse. It should be noted that the operating characteristics of the regenerative fuel cell can also be achieved through the use of a PEM fuel cell and a PEM electrolyzer operating in the same device. Still other changes or modifications are possible, and the embodiments which are described herein are illustrative only and not limiting of the invention, the invention being defined and limited by the following claims and equivalents thereof.

What is claimed is:

1. A segmented metal hydride battery system comprising:

a) a containment can;

b) a stack of hydrogen-metal oxide cells, defining a hydrogen-metal oxide battery, disposed within the containment can;

c) a hermetically enclosed hydrogen storage chamber having at least one aperture and containing a metal hydride material for retaining and storing a concentrated volume of hydrogen, said metal hydride material being capable of releasably absorbing and discharging gaseous hydrogen, and said metal hydride material comprising a mixture of water vapor absorbing particles and metal hydride particles;

d) a communication means at least one aperture and disposed between said hydrogen-metal oxide battery and the enclosed hydrogen storage chamber for permitting reversible communication of a hydrogen gas stream flow between said battery and said chamber;

e) a means for selectively opening and closing said communication means to selectively permit and restrict hydrogen gas flow between said hydrogen-metal oxide battery and said enclosed hydrogen storage vessel through said aperture.

2. The battery system of claim 1 wherein said water vapor absorbing particles are in a predetermined portion range to metal hydride particles in a weight ratio of from about 0.01 to about 0.01 to 0.1.

3. The battery system according to claim 2 wherein said ratio by weight of water absorbing particles to metal hydride particles is between about 0.03 to 1.0 to about 0.07 to 1.0.

4. The battery system according to claim 3 wherein said ratio by weight of water absorbing particles to metal hydride particles is approximately 1 to 20.

5. The battery system according to claim 1 wherein the relative average diameters of said water absorbing particles to said metal hydride particles is in a ratio of about 1 to 2.

6. The battery system according to claim 4 wherein said average particle size of said water absorbing particles is approximately 0.00079 inches and said metal hydride particles is approximately 0.0017 inches.

7. The battery system according to claim 1 wherein said water vapor absorbing particles comprise a desiccant material.

8. The battery system according to claim 1 wherein said water vapor absorbing material further comprises particles of one or more compounds selected from the group consisting of silica gel powder ($SiO_2$) and molecular sieve powder ($Na_{12}[(AlO_2)_{12}(SiO_2)_{12}]xH_2O$).

9. The battery system according to claim 1 wherein said metal hydride particles further include a thin film material disposed around and enclosing the metal hydride particles, the thin film material having the characteristics and thickness capable of diffusing hydrogen therethrough but being essentially impervious to oxygen, carbon dioxide and water vapor, said film material providing an effective enclosure for inhibiting oxygen, carbon dioxide and water vapor from reaching the metal hydride, hydrogen storage material.

10. The battery system according to claim 9 wherein said predetermined range of proportions of water absorbing to metal hydride particles are in a weight ration of from about 0.03 to 1.0 to about 0.07 to 1.0.

11. The battery system according to claim 10 wherein said water vapor absorbing material further comprises particles of one or more compounds selected from the group consisting of silica gel powder ($SiO_2$) and molecular sieve powder ($Na_{12}[AlO_2)_{12}(SiO_2)_{12}]xH_2O$).

12. The battery system according to claim 11 wherein said metal hydride particles further comprise one or more metallic alloys chosen from the group consisting of Lanthanum Nickel ($LaNi_5$), Lanthanum Nickel Aluminum ($LaNi_{4.7}Al_{0.3}$) and $La_{0.8}Nd_{0.2}Ni_{3.5}Co_{1.3}Al_{0.2}$.

13. The battery system according to claim 1 wherein said metal hydride particles further comprise one or more metallic alloys chosen from the group consisting of Lanthanum Nickel ($LaNi_5$), Lanthanum Nickel Aluminum ($LaNi_{4.7}Al_{0.3}$) and $La_{0.2}Nd_{0.2}Ni_{3.5}Co_{1.3}Al_{0.2}$.

14. The battery system according to claim 1 wherein said electrochemical device comprises an electrolyzer and fuel cell or a regeneration fuel cell.

15. The battery system according to claim 1 wherein the relative average diameters of said water absorbing particles to said metal hydride particles is in a ratio of about 1 to 20.

* * * * *